United States Patent Office 3,256,212
Patented June 14, 1966

3,256,212
PROCESS FOR SEPARATING POLYVINYL BUTYRAL FROM A PLASTICIZED MIXTURE
Martin M. Grover, Upper Montclair, and Jerome B. Marks, Bloomfield, N.J., assignors to Pittsburgh Plate Glass Company, Pittsburgh, Pa., a corporation of Pennsylvania
No Drawing. Filed Feb. 12, 1963, Ser. No. 257,882
15 Claims. (Cl. 260—2.3)

This invention relates to a method of separating polyvinyl butyral from admixtures with a plasticizer, whereby there are recovered relatively pure polyvinyl butyral and plasticizer.

Polyvinyl butyral is butyraldehyde-modified polyvinyl alcohol and is made up primarily of units of the formula:

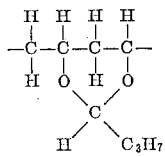

An important commercial use for polyvinyl butyral is as the major component of the interlayer in the glass laminates popularly known as safety glass and commonly used in making automobile and aircraft windshields and the like. Several million pounds of polyvinyl butyral film are annually employed for this purpose. A typical polyvinyl butyral resin employed in making these films has a butyral content of about 80 percent, a hydroxyl content of about 17.5 percent expressed as polyvinyl alcohol, and an acetate content of about 2.5 percent, expressed as polyvinyl acetate.

The film which is so utilized contains substantial amounts of plasticizer along with the polyvinyl butyral, usually about 30 percent, although in some instances commercially produced materials have about 16 percent plasticizer. Almost exclusively used in the making of these automotive glass laminates are those products known commercially as "Saflex" and "Butacite." The plasticizer generally present in the commercial materials is triethylene glycol di(2-ethyl butyrate), which is known as "Flexol 3GH." Other plasticizers for polyvinyl butyral include trioctyl phosphate, dibutyl sebacate and similar materials which are compatible with polyvinyl butyral and which exert a solvating action thereon; the invention is applicable to polyvinyl butyral containing any such plasticizer.

During the various processing steps involved in the production of laminated glass products comprising a polyvinyl butyral interlayer, a substantial amount of the polyvinyl butyral film is trimmed and discarded or otherwise scrapped. Much of the scrapped material no longer meets the high optical and other standards necessary for use in safety glass applications, and is therefore unusable for this purpose. In most instances, the scrapped or rejected polyvinyl butyral film is also unusable in other applications wherein polyvinyl butyral is required because of the presence of the plasticizer in such large amounts. For example, good heat-resistant adhesives in which polyvinyl butyral is a major constituent cannot be made using polyvinyl butyral containing the aforesaid plasticizer because the presence of the plasticizer results in a weakening of the adhesive.

Thus, in spite of the wide availability and low cost of the scrapped polyvinyl butyral film, and despite the various other uses for polyvinyl butyral and its much higher cost when pure, this scrap has not heretofore been utilized in any application wherein the plasticizer exerts an adverse effect. This is believed to be due to the lack of any good method for separating the polyvinyl butyral from the plasticizer. It appears that it has been considered impossible to recover the polyvinyl butyral, largely because the polyvinyl butyral used in safety glass manufacture is pressed into sheet or film form along with intimately and homogeneously blended plasticizer. Furthermore, certain properties necessary to its use in safety glass applications, such as the nature of the interaction between the polyvinyl butyral and the plasticizer and their affinity for each other, would seem to preclude the application of known separation techniques to these products.

The basis for this invention is the discovery that the plasticizer can be separated from polyvinyl butyral materials, such as that used in safety glass manufacture, by a relatively simple and surprisingly effective method. The method comprises intimately contacting polyvinyl butyral containing the plasticizer with a volatile liquid in which the plasticizer is substantially more soluble than is polyvinyl butyral, and separating the resultant liquid phase from the polyvinyl butyral. Such treatment removes the plasticizer from the polyvinyl butyral material, even though it is closely combined with the polyvinyl butyral as is the case in the films employed in making safety glass. Up to 95 percent or more of the plasticizer is removed efficiently and economically, resulting in recovered polyvinyl butyral having a purity of 98 percent or higher.

The separation method of the invention can be carried out in any of several ways. It is applicable, for example, to continuous operation using conventional continuous processing equipment. The presently preferred mode of operation is a batch-type process using several treatment cycles, in which the polyvinyl butyral material is contacted with successive portions of the volatile liquid and the resultant liquid phase is separated from the solid phase comprising polyvinyl butyral prior to contact with the next portion of liquid. Three cycles are ordinarily sufficient to obtain good separation, although more can be utilized if desired and substantial separation is achieved with but one treatment cycle.

An advantage of the invention is that organic dyes or other dyes and colorants do not interfere with the separation method as described herein. Thus, polyvinyl butyral can be recovered from scrapped material containing a coloring agent, such as, for example, the polyvinyl butyral film intended for use in making tinted glass windshields.

It is an additional feature of the method described herein that the plasticizer can generally be quantitatively recovered from the liquid phase, for example, by distillation. The recovery of the plasticizer and the reuse of the volatile liquid make the method of this invention even more economically attractive.

The liquid employed in the process must be volatile. That is, it should have an appreciable vapor pressure at reasonable temperatures that can be attained in production equipment, i.e., at about 400° F. or lower, so that it can be evaporated at such temperatures if desired.

The ratio of liquid to the polyvinyl butyral material can be varied widely without affecting the operability of the method. Provided a liquid phase is maintained, even small amounts of liquid result in some separation. Proportionately very large amounts of liquid can also be used but are not usually desirable because of problems in handling and recovery and the attendant increased costs. The factors influencing the amount of liquid utilized include the nature of the liquid, the manner of operation, the number of treatment cycles, the temperature of operation, and the like. In a batch-type process, at least equal weights of liquid and polyvinyl butyral material are generally utilized in any one treatment cycle, although widely varying ratios of liquid to polyvinyl butyral material, for example, as low as about 1:3 or lower can be employed if desired, depending on the factors discussed above. Any amount of liquid in excess can be used depending upon the degree of purity desired, and is limited only by practical considerations.

The solvent action of the liquid is an important characteristic. Liquids in their relation to polymeric materials, such as polyvinyl butyral, are categorized in the art as solvents for the polymer, partial solvents, swelling solvents, and non-solvents. Often used to classify a liquid into one of these types is a test in which 10 percent by weight of the polymer—in this instance polyvinyl butyral—is agitated with 90 percent by weight of the liquid for 24 hours at room temperature. If at the end of this time a clear solution with no solid phase is obtained, the liquid is a "solvent" for polyvinyl butyral. If solid polyvinyl butyral remains but is swollen, and the liquid phase contains appreciable dissolved butyral, the liquid is a "partial solvent" for polyvinyl butyral. When the solid polyvinyl butyral is swelled but the liquid phase does not contain dissolved butyral to any appreciable extent, the liquid is considered to be a "swelling solvent" for polyvinyl butyral. "Non-solvents" are those liquids which neither appreciably swell nor dissolve the polyvinyl butyral under the conditions of this test. The terms applied to the liquids used in the invention described and claimed herein have the meaning given them in the art, based upon the above tests.

Any liquid in which the plasticizer is substantially more soluble than is polyvinyl butyral can be employed in practicing the invention herein. In terms of the above test, these include non-solvents and swelling solvents; partial solvents may also be utilized but generally are less desirable. Various mixtures and blends of liquids can also be used, and these may include a solvent; the preferred liquids are blends which provide slight or incipient swelling of the polyvinyl butyral without dissolving it.

The non-solvents for polyvinyl butyral include liquid aliphatic and cycloaliphatic hydrocarbons, such as hexane, heptane, decane, heptene, cyclohexane, cycloheptene, cycloheptane and others, preferably having up to about 12 carbon atoms, as well as various isomers and mixtures of such hydrocarbons, including varnish makers' and painters' (VMP) naphtha, textile spirits, Stoddard solvent, gasoline, and the like. Also included among the non-solvents are other liquids of various types, such as butyl ether and nitromethane. Non-solvents are quite effective in separating the polyvinyl butyral, especially when a batch separation process is employed. Thus it is usually preferred to employ a non-solvent, at least in part.

Among those liquids which are swelling solvents, as characterized by the above test, are aromatic hydrocarbons such as benzene, toluene and xylene, 1,1,1-trichloroethane, carbon tetrachloride, ethylene dichloride, acetone, diisobutyl ketone, acetonyl acetone, ethyl acetate, isopropyl acetate, amyl acetate, and nitropropane. Swelling solvents can be used alone but are less desirable in a batch process than are those liquids in which polyvinyl butyral is both insoluble and non-swelling, but can be used effectively in a continuous process. However, they often require the use of higher solvent to butyral ratios, e.g., substantially in excess of 1:1 in a batch process.

It has been found, however, that the inclusion of a swelling solvent with one in which polyvinyl butyral is both insoluble and non-swelling, i.e., a non-solvent, in the liquid used to treat the polyvinyl butyral greatly increases the efficiency of the process. This is particularly true in the second and subsequent cycles of a multi-stage batch separation process. For example, a single treatment with hexane alone is effective in removing a major portion of the plasticizer, but the efficiency of the treatment with hexane alone drops off in subsequent treatments of the partially separated polyvinyl butyral. It appears that the polyvinyl butyral with part of the plasticizer removed is more inert to hexane than the original material, and the remaining plasticizer is thus more difficultly removed by contact with the hexane. However, when a portion of the hexane is replaced with a swelling solvent such as toluene, to produce a moderately swelling mixture, the polyvinyl butyral is continuously swelled at its surface, and the swelling, even if slight, permits more effective contact between the liquid and the plasticizer. Thus, although the liquid can be wholly made up of one or more non-solvents, it is preferred that some swelling solvent be present. However, in the preferred embodiment of the invention it is generally best if at least about 15 percent of the liquid is a solvent for the plasticizer in which polyvinyl butyral is substantially insoluble, i.e., a non-solvent. Thus in these preferred liquids, up to about 85 percent of the liquid can be swelling solvent, and as little as about 10 percent or less of swelling solvent in the liquid has a significant effect in promoting the efficiency of the process.

Partial solvents as defined above can be used alone in the process, but are less desirable because they require large excess of solvent in order to achieve desirable levels of plasticizer removal, and because some polyvinyl butyral may be carried into the liquid phase. However, they can be effectively employed in a continuous process or as part of a mixture with a non-solvent. Up to about 40 percent by weight of partial solvent in conjunction with a non-solvent generally produces satisfactory results in the preferred batch-type process. Among those liquids which are partial solvents are chloroform, trichloroethylene, propylene dichloride, methylethyl ketone, methyl isobutyl ketone, cyclohexanone, butyl acetate (98 percent), and 2-amino-2-methyl-1-propanol.

Those liquids which are solvents for polyvinyl butyral, in accordance with the categorizing test described above, cannot be used alone in the invention. However, they can be employed with good results as part of a mixture with a non-solvent, thus making the mixture a swelling solvent or a partial solvent. Such mixtures can usually contain up to about 30 percent by weight of a solvent in conjunction with a non-solvent. Solvents for polyvinyl butyral include dioxane, isophorone, and alcohols such as methanol, ethanol, isopropanol, butanol, diacetone alcohol and ethylene glycol monoethyl ether.

The conditions such as temperature and pressure at which the treatment is carried out are not critical; low or elevated temperatures and sub-atmospheric and super-atmospheric pressures can be used, limited only by the stability of the components of the separation mixture and the economic limitations imposed by the capabilities of production equipment and the increased cost of such processes. However, pressures in excess of atmospheric are usually avoided, and thus temperatures higher than the reflux temperature of the liquid employed are ordinarily not employed.

Although the process operates effectively at elevated temperatures, and in certain respects more efficiently than at room temperature, it should be noted that such temperatures may change the solubility characteristics of the various liquids which may be employed. The choice of the liquid employed should be governed by its characterization at the temperature of operation. For example, hexane becomes somewhat of a swelling solvent under reflux temperatures and the swelling action of such solvents as toluene is increased when heated. Similarly, a swelling solvent at room temperature may become a partial solvent at elevated temperatures, and a partial solvent may become a solvent for polyvinyl butyral.

Demonstrating the efficiency of the treatment method described herein was a series of tests in which the relative efficiencies of various solvents and solvent blends were examined. In these tests, a 100 gram sample of scrapped polyvinyl butyral containing 29 percent of triethylene glycol di(2-ethyl butyrate) as the plasticizer ("Saflex") was rolled for 2.5 hours at room temperature in 100 grams of a liquid of the class described. The liquid was then drained from the polyvinyl butyral and the amount of plasticizer removed determined. Table I sets forth the data in certain representative tests of this series. (All ratios, parts and percentages in the table, as well as throughout the specification, are by weight. The ethyl acetate utilized was the commercial 99 percent grade.)

TABLE I

| Liquid: | Percent plasticizer removed |
|---|---|
| Toluene | 22.1 |
| Hexane | 49.6 |
| Hexane—50%, toluene—50% | 58.6 |
| Hexane—75%, toluene—25% | 61.0 |
| Hexane—25%, toluene—75% | 44.5 |
| Hexane—75%, methylethyl ketone—25% | 56.5 |
| Hexane—75%, ethyl acetate—25% | 60.7 |
| Hexane—50%, 1,1,1-trichloroethane—50% | 56.9 |
| VMP naphtha | 44.4 |
| VMP naphtha—50%, toluene—50% | 54.3 |
| VMP naphtha—75%, ethyl acetate—25% | 55.9 |
| Cyclohexane | 46.3 |
| Cyclohexane—50%, toluene—50% | 50.0 |
| Cyclohexane—75%, ethyl acetate—25% | 48.0 |
| Heptane | 47.6 |
| Heptane—50%, toluene—50% | 54.8 |
| Heptane—75%, ethylacetate—25% | 57.6 |
| Butyl ether | 51.1 |
| Butyl ether—50%, toluene—50% | 49.8 |
| Butyl ether—75%, ethyl acetate—25% | 51.8 |
| Heptene | 49.8 |
| Heptene—50%, toluene—50% | 51.4 |
| Heptene—75%, ethyl acetate—25% | 58.3 |
| Hexane—95%, ethanol—5% | 52.8 |
| Hexane—85%, ethanol—15% | 48.0 |
| Hexane—75%, ethanol—25% | 38.0 |

It will be realized that the foregoing tests did not employ optimum conditions but rather illustrate the comparative efficiency of various liquids in a simple and easily carried out embodiment of the process.

As noted above, swelling solvents, when used alone, require an excess of the swelling solvent over the normally used 1:1 weight ratio for efficient separation. Illustrating the effect of increasing the liquid to butyral ratio where tests carried out in the same manner as those described above but using varying ratios of solvent to polyvinyl butyral film. The results of several of such tests are set forth in Table II below.

TABLE II

| Liquid | Liquid to Butyral Ratio | Percent Plasticizer Removed |
|---|---|---|
| Ethyl acetate | 3:1 | 45.3 |
| Do | 6:1 | 73.2 |
| Do | 9:1 | 81.8 |
| Toluene | 3:1 | 66.3 |
| Do | 6:1 | 86.0 |
| Do | 9:1 | 87.3 |
| Acetone | 3:1 | 39.0 |
| Do | 6:1 | 78.0 |
| Do | 9:1 | 87.7 |

Alternatively, swelling solvents, as well as partial solvents, can be employed with quite satisfactory results in a continuous process, and in some instances swelling solvents in such a process are more effective than liquids containing a non-solvent. Typically in such a process, the liquid is continuously and swiftly passed through a bed of the polyvinyl butyral material. Several tests illustrating the effect of a continuous process were carried out by mixing and shaking 100 grams of liquid with 100 grams of scrapped polyvinyl butyral ribbon, containing about 30 percent of triethylene glycol di(2-ethyl butyrate), for 10 seconds. The liquid was then decanted and another 100 gram portion added. After a total of fifteen such 10-second washes and decantations in each instance, the results shown in Table III were obtained.

TABLE III

| Liquid: | Percent plasticizer removed |
|---|---|
| Acetone | 93.5 |
| Ethyl acetate | 89.4 |
| Toluene | 84.9 |

The above process can be easily adapted to commercial equipment and the liquid can be distilled and recycled, thus minimizing the total quantity of liquid necessary.

Exemplifying the preferred practice of the invention on a larger scale were tests such as one in which 20 pounds of the aforesaid scrapped polyvinyl butyral, comprising 14.2 pounds of polyvinyl butyral and 5.8 pounds of triethylene glycol di(2-ethyl butyrate) plasticizer, were shredded and charged into a vessel along with 10 pounds of hexane and 10 pounds of toluene and agitated for 8 hours at room temperature. At the end of this time the liquid phase, which was comprised of 11.5 pounds of solvent and 3.5 pounds of plasticizer, was drained off. The partially separated polyvinyl butyral film was composed of 14.2 pounds of polyvinyl butyral and 2.3 pounds of plasticizer along with 8.5 pounds of solvent, and was again treated with 20 pounds of a 1:1 hexane-toluene mixture in the same manner as before. At the end of this second cycle there was drained off a solution of 1.6 pounds of plasticizer in 18.7 pounds of solvent and the treated polyvinyl butyral film was composed of 14.2 pounds of polyvinyl butyral, 0.7 pound of plasticizer and 9.8 pounds of solvent. Twenty pounds of liquid were again added as before, and at the end of this third cycle 20.48 pounds of liquid, containing 0.48 pound plasticizer, was removed. The polyvinyl butyral remaining contained 0.22 pound of plasticizer and 9.8 pounds of solvent. Thus, a total of 5.58 pounds of plasticizer was removed from the original 20 pounds of scrap material, or 96.2 percent of the plasticizer originally present. The polyvinyl butyral, after drying to remove the solvent, was 98.5 percent pure.

As indicated by the above example, part of the liquid remains with the polyvinyl butyral and need not be removed in each separation. At the end of the process any remaining liquid is easily removed by drying, as by heating and evaporation. A typical drying cycle is carried out at 225° F. to 250° F. for 1 to 2 hours in a tray-type dryer. It may be noted that in many instances the solvent-wet product need not be dried; for example, it may be further dissolved without drying for use in coating compositions, wash primers, and the like.

Although in the example illustrated each cycle was carried out for about 8 hours, this time can be substantially reduced, and in most instances each cycle can be carried out in 2 to 4 hours or less without appreciable loss in efficiency. Similarly, the invention is easily adapted to continuous separation methods by employing modifications and equipment conventional to the art.

The polyvinyl butyral recovered in the aforesaid manner is usable in several ways in which the scrap material containing substantial amounts of plasticizer, i.e., 15 percent or more, cannot be successfully employed. To illustrate this, three samples of a conventional and widely used type of adhesive were made up as follows:

| | Adhesive A (Parts by weight) | Adhesive B (Parts by weight) | Adhesive C (Parts by weight) |
|---|---|---|---|
| Polyvinyl butyral obtained above (dried) | 100 | | |
| Safety glass grade polyvinyl butyral (Butvar B-72A) | | 100 | |
| Untreated "Saflex" scrap | | | 100 |
| BLS-2700 [1] (56 percent in ethanol) | 179 | 179 | 179 |
| Ethyl alcohol | 540 | 540 | 540 |
| Toluene | 180 | 180 | 180 |

[1] Thermosetting phenol-formaldehyde resin produced by condensing phenol with excess formaldehyde under alkaline conditions.

It will be noted that the three adhesives made up above differ only in the polyvinyl butyral component. These adhesives were then examined for bonding properties using the following tests:

*Peel test.*—An approximate 2.5-mil coating of each of the adhesives was brushed on each of two 12-inch by 1-inch strips of 0.016 inch thick aluminum and dried for 20 minutes at room temperature. A second 2.5-mil coat was applied and dried for 1 hour at room temperature and then 15 minutes at 190° F. The adhesive-coated aluminum strips were bonded by curing at 300° F. for 20 minutes at 100 p.s.i. and the bonded specimens were separated by peeling them at a 180° angle at a rate of 20 inches per minute. Adhesives A and B each peeled at 35 pounds per inch average, whereas Adhesive C peeled at an average of only 25 pounds per inch.

*Tensile shear test.*—Overlap shear specimens were prepared using chemically cleaned aluminum 0.064 inch thick and 1 inch wide. The adhesives were applied to each surface as a 2.5-mil coating, dried for 1 hour, and a second 2.5-mil coating applied and dried overnight at room temperature. The strips were then bonded, using a ½-inch overlap joint, and cured for 3 minutes at 325° F. at 200 p.s.i. Using a loading rate of 1200 pounds per minute at 160° F., each of Adhesives A and B showed an average tensile shear strength of about 250 p.s.i., whereas Adhesive C showed the corresponding value of 175 p.s.i. Thus, the presence of the plasticizer caused Adhesive C to soften markedly at 160° F. as compared to the other two adhesives.

An even greater difference between the adhesives is shown in a long time holding ability test, where after curing the overlap specimens made up as described above for 30 minutes at 325° F., they are loaded at 160° F. and held at this temperature under a load which is about 50 percent of the breaking load. In this test Adhesives A and B demonstrate a holding ability several times greater than does Adhesive C.

These and other tests have demonstrated that treatment of polyvinyl butyral containing substantial amounts of plasticizer with a liquid of the class described hereinabove produces polyvinyl butyral which can be used in compositions in which the plasticized polyvinyl butyral is wholly undesirable.

According to the provisions of the patent statutes, there are described above the invention and what are now considered to be its best embodiments. However, within the scope of the appended claims, it is to be understood that the invention can be practiced otherwise than as specifically described.

We claim:

1. A method of separating polyvinyl butyral from a homogeneous and intimate mixture of polyvinyl butyral with a plasticizer compatible therewith and which exerts a solvating action thereon, said method comprising contacting said mixture with a volatile liquid in which said plasticizer is substantially more soluble than is polyvinyl butyral, and separating the liquid phase from the polyvinyl butyral; said volatile liquid containing:

(a) at least one member of the class consisting of aliphatic hydrocarbons of up to about 12 carbon atoms, cycloaliphatic hydrocarbons of up to about 12 carbon atoms, butyl ether, nitromethane, aromatic hydrocarbons, 1,1,1-trichloroethane, carbon tetrachloride, ethylene dichloride, acetone, diisobutyl ketone, acetonyl acetone, ethyl acetate, isopropyl acetate, amyl acetate and nitropropane;

(b) up to about 40 percent by weight of a member of the class consisting of chloroform, trichloroethylene, propylene dichloride, methyl ethyl ketone, methyl isobutyl ketone, cyclohexanone, butyl acetate and 2-amino-2-ethyl-1-propanol; and (c) up to about 30 percent by weight of a member of the class consisting of dioxane, isophorone, alcohols, of 1 to 4 carbon atoms, diacetone alcohol and ethylene glycol monoethyl ether.

2. The method of claim 1 in which the plasticizer comprises triethylene glycol di(2-ethyl butyrate).

3. The method of claim 1 in which said liquid is a non-solvent for polyvinyl butyral.

4. The method of claim 1 in which said liquid is a swelling solvent for polyvinyl butyral.

5. The method of claim 1 in which said liquid is a mixture of a non-solvent for polyvinyl butyral and a swelling solvent for polyvinyl butyral.

6. The method of claim 5 in which said mixture comprises at least about 15 percent by weight of said non-solvent for polyvinyl butyral.

7. The method of claim 1 in which said liquid is a mixture of a non-solvent for polyvinyl butyral and a partial solvent for polyvinyl butyral.

8. The method of claim 1 in which said liquid is a mixture of a non-solvent for polyvinyl butyral and up to about 30 percent by weight of a solvent for polyvinyl butyral.

9. The method of claim 1 in which said mixture is contacted with successive portions of said volatile liquid with the resultant liquid phase being separated from the polyvinyl butyral prior to contact with the next successive portion of said volatile liquid.

10. The method of claim 9 in which said plasticizer comprises triethylene glycol di(2-ethyl butyrate).

11. The method of claim 9 in which said liquid is a mixture of an aliphatic hydrocarbon of up to about 12 carbon atoms and an aromatic hydrocarbon.

12. A method of separating polyvinyl butyral from a homogeneous and intimate mixture of polyvinyl butyral with a plasticizer compatible therewith and which exerts a solvating action thereon, said method comprising contacting said mixture with a volatile liquid in which said plasticizer is substantially more soluble than is polyvinyl butyral and separating the liquid phase from the polyvinyl butyral, said volatile liquid containing at least about 15 percent by weight of at least one member of the class consisting of aliphatic and cycloaliphatic hydrocarbons of up to about 12 carbon atoms.

13. The method of claim 12 in which said mixture is contacted with successive portions of said volatile liquid with the resultant liquid phase being separated from the polyvinyl butyral prior to contact with the next successive portion of volatile liquid.

14. A method of obtaining polyvinyl butyral having a purity of at least about 98 percent from sheet material containing a homogeneous and intimate mixture of polyvinyl butyral with at least about 15 percent by weight of a plasticizer compatible with polyvinyl butyral and which exerts a solvating action thereon; said method comprising contacting said sheet material with a volatile liquid in which said plasticizer is substantially more soluble than is polyvinyl butyral using a weight ratio of said liquid to said sheet material of at least about 1 to 3, and separating the liquid phase from the solid polyvinyl butyral; said volatile liquid containing:

(a) at least one member of the class consisting of aliphatic hydrocarbons of up to about 12 carbon atoms, cycloaliphatic hydrocarbons of up to about 12 carbon atoms, butyl ether, nitromethane, aromatic hydrocarbons, 1,1,1-trichloroethane, carbon tetrachloride, ethylene dichloride, actone, diisobutyl ketone, acetonyl acetone, ethyl acetate, isopropyl acetate, amyl acetate and nitropropane;

(b) up to about 40 percent by weight of a member of the class consisting of chloroform, trichloroethylene, propylene dichloride, methyl ethyl ketone, methyl isobutyl ketone, cyclohexanone, butyl acetate and 2-amino-2-ethyl-1-propanol; and (c) up to about 30 percent by weight of a member of the class consisting of dioxane, isophorone, alcohols of 1 to 4 carbon atoms, diacetone alcohol and ethylene glycol monoethyl ether.

15. The method of claim 14 in which said weight ratio of said liquid to said sheet material is at least about 1 to 1.

References Cited by the Examiner

UNITED STATES PATENTS

| | | | |
|---|---|---|---|
| 1,964,191 | 6/1934 | Branchen | 260—2.3 |
| 2,794,057 | 5/1957 | Gunther | 260—2.3 |
| 2,921,038 | 6/1960 | Gunther | 260—2.3 |
| 3,058,933 | 10/1962 | Ikeda | 260—31.2 |

MURRAY TILLMAN, *Primary Examiner.*

DONALD E. CZAJA, *Examiner.*

J. A. KOLASCH, W. L. BASCOMB, *Assistant Examiners.*